UNITED STATES PATENT OFFICE.

ISAAC WELLS, OF WILMINGTON, NORTH CAROLINA, ASSIGNOR TO HIMSELF, JAMES F. POST, OF SAME PLACE, AND DAVID D. BARBER, OF SUMTER COUNTY, SOUTH CAROLINA.

IMPROVEMENT IN PROCESSES FOR TANNING LEATHER.

Specification forming part of Letters Patent No. 198,477, dated December 25, 1877; application filed August 27, 1877.

*To all whom it may concern:*

Be it known that I, ISAAC WELLS, of Wilmington, in the county of New Hanover and State of North Carolina, have invented certain new and useful Improvements in Processes for Tanning Leather; and I do hereby declare the following to be a full, clear, and exact description of the invention, such as will enable others skilled in the art to which it pertains to use it.

My invention consists in the process of tanning leather, hereinafter described and claimed.

I make a compound, which consists of the several ingredients in their parts and proportions, as follows: Sixty pounds of May-weed; fifteen pounds of gambier; seven and one-half pounds of extract of bark; fifteen pounds of bark; two and one-half pounds of American sumach; two and one-half pounds of Sicily sumach; five pounds of salt; one and one-fourth pound of alum.

The bark above mentioned is used for coloring purposes, and it depends upon the color I wish the leather to be that I select one or more of the three barks—white-oak, yellow-oak, and hemlock. If one only of the said barks is to be used, the same would be white-oak; if two are to be used, hemlock would be combined with the white-oak; while in other case the three—white and yellow oak and hemlock—would be mixed together. The extract of bark, which forms one of the elements of the compound, may be made from yellow and red oak, or from chestnut and oak.

The above compound is sufficient for about ten sides of raw hides or twenty-five sides of calf, and is only used at first in half its strength, the hides being allowed to remain in a vat subjected to such a solution thereof for a period of about two days, which serves to color and partially tan the stock. The hides are next put into a second vat containing the full strength of this compound, and there allowed to remain for another period of about two days. I then add to this last-named vat, with its above-described contents, ten pounds, more or less, of an extract of May-weed, produced as follows, and which is not individually claimed here, as it forms the subject-matter of another application for patent.

May-weed, or *Anthemis cotula*, as known in botany, is taken when freshly cut, ground up into a mass, and passed through pressure-rollers, which extracts the great proportion of the tannic acid therefrom. That proportion which, however, yet remains in the mass is next largely extracted by moistening the said mass with steam, and compressing it in a suitable press. The liquid obtained by this second step is collected in a separate vessel. The mass is then subjected to an air-suction treatment by ordinary means, and finally moistened with diluted sulphuric acid. This last-extracted liquid is exposed to the open air for a time sufficient to free it from any perceptible trace of this diluted acid. The three several collections of liquid are then united in one quantity, and constitutes the extract which is used in the present-described process of tanning.

The stock to be tanned remains in the vat subjected to the action of the tanning solution thus made for about four days. This latter solution serves to harden the outer or side body without thoroughly penetrating the inner body of the stock, thus making the exterior hard, while the interior is soft.

This treatment is active and severe in its effect, giving a durable wearing-surface to the leather, and yet leaving the inner body thereof pliant and flexible, while at the same time it accomplishes the tanning in a quick and speedy manner.

I am aware of the patent granted to Johnson under date of June 15, 1858, No. 20,565, in which some of the same ingredients are used as by me, and I desire to be understood as disclaiming as my invention any of the elements used in the above process, except the said extract of May-weed, which latter is disclaimed as far as this application is concerned, inasmuch as it forms the subject-matter of a separate application, as before referred to.

Having fully described my invention, what I claim as new, and desire to secure by Letters Patent, is—

The described process of tanning leather, the same consisting in subjecting the stock first to a compound solution of May-weed, gambier, extract of bark, bark, American sumach, Sicily sumach, salt, and alum in one-half its strength; secondly, to the said compound solution in its full strength; and, finally, to a mixture of the said compound with the described extract of May-weed, all substantially as and for the purpose herein set forth.

ISAAC WELLS.

Witnesses:
J. W. LAMB,
R. O. GRANT.